(12) United States Patent
Rodriguez et al.

(10) Patent No.: US 7,756,051 B2
(45) Date of Patent: Jul. 13, 2010

(54) CONTENT DISTRIBUTION USING NETWORK CODING

(75) Inventors: Pablo Rodriguez Rodriguez, Cambridge (GB); Christos Gkantsidis, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 1394 days.

(21) Appl. No.: 11/152,754

(22) Filed: Jun. 13, 2005

(65) Prior Publication Data

US 2006/0020560 A1      Jan. 26, 2006

Related U.S. Application Data

(60) Provisional application No. 60/585,212, filed on Jul. 2, 2004.

(51) Int. Cl.
| | |
|---|---|
| H04L 12/26 | (2006.01) |
| H04L 12/56 | (2006.01) |
| H04N 7/12 | (2006.01) |
| H04N 1/41 | (2006.01) |
| G06K 9/36 | (2006.01) |
| G06F 15/16 | (2006.01) |

(52) U.S. Cl. ............... 370/252; 370/400; 348/394.1; 358/426.14; 375/240.12; 382/238; 709/232

(58) Field of Classification Search ............ 370/252, 370/400; 348/394.1; 358/426.14; 375/240.12; 382/238; 709/232
See application file for complete search history.

(56) References Cited

U.S. PATENT DOCUMENTS

| | | | |
|---|---|---|---|
| 6,404,814 B1 * | 6/2002 | Apostolopoulos et al. ............ 375/240.12 |
| 6,639,954 B2 * | 10/2003 | Kuroiwa et al. ............ 375/341 |
| 6,760,479 B1 * | 7/2004 | Feria ............ 382/238 |
| 6,765,967 B2 * | 7/2004 | Dowling ............ 375/254 |
| 6,775,325 B1 * | 8/2004 | Florencio ............ 375/240.03 |
| 6,944,226 B1 * | 9/2005 | Lin et al. ............ 375/240.2 |
| 7,082,220 B2 * | 7/2006 | Kondo et al. ............ 382/238 |
| 7,197,084 B2 * | 3/2007 | Ketchum et al. ............ 375/296 |
| 7,203,893 B2 * | 4/2007 | Kerr et al. ............ 714/780 |
| 7,277,950 B1 * | 10/2007 | Chapweske ............ 709/227 |
| 7,334,051 B2 * | 2/2008 | Koyata et al. ............ 709/246 |
| 7,366,660 B2 * | 4/2008 | Kondo et al. ............ 704/219 |
| 7,418,110 B2 * | 8/2008 | Lubin et al. ............ 382/100 |
| 7,668,712 B2 * | 2/2010 | Wang et al. ............ 704/219 |
| 2005/0010675 A1 * | 1/2005 | Jaggi et al. ............ 709/232 |
| 2007/0041447 A1 * | 2/2007 | Burazerovic et al. ... 375/240.18 |

FOREIGN PATENT DOCUMENTS

EP          1427170 A2      6/2004

OTHER PUBLICATIONS

Koetter et al., "Beyond Routing: An Algebraic Approach to Network Coding", IEEE Infocom 2002.

(Continued)

*Primary Examiner*—Alpus H Hsu

(57) ABSTRACT

A content distribution mechanism that relies on cooperative desktop PCs to distribute content is disclosed. The mechanism distributes content in a robust manner by allowing at least one intermediate network node (i.e., between a source and client) to generate and send packets that contain a linear combination of the portions of content available at the node. Such linear combinations may be created by the source and client using at least a portion of the original content file in either encoded or unencoded form. After the client has received enough linearly independent combinations of packets, the original content may be reconstructed.

18 Claims, 5 Drawing Sheets

OTHER PUBLICATIONS

R. Rejaie and S. Stafford, "'A Framework for Architecting Peer-to-Peer Receiver-driven Overlays", Nossdav 04, Ireland, Jun. 2004.

K. Jain, L. Lovasz, and P. A. Chou, "Building scalable and robust peer-to-peer overlay networks for broadcasting using network coding", Under Submission to ACM-SIAM (SODA 05).

P. A. Chou, Y. Wu, and K. Jain, "Network coding for the Internet", IEEE Communication Theory Workshop, Italy, May 2003.

Ying Zhu, Baochun Li, Jiang Guo, "Multicast with Network Coding in Application-Layer Overlay Networks," IEEE Journal on Selected Areas in Communications, Jan. 2004.

P. A. Chou, Y. Wu, and K. Jain, "Practical network coding", Allerton Conference on Communication, Control, and Computing, Monticello, II, Oct. 2003.

Zongpeng Li, Baochun Li, Dan Jiang, and Lap Chi Lau, "On Achieving Optimal End-to-End Throughput in Data Networks: Theoretical and Empirical Studies", ECE Technical Report, University of Toronto, Feb. 2004.

R. Ahlswede, N. Cai, S. R. Li, and R. W. Yeung, "Network Information Flow", IEEE Transactions on Information Theory, Jul. 2000.

M. Castro, P. Druschel, A.-M. Kermarrec, A. Nandi, A. Rowstron, and A. Singh, "SplitStream: High-Bandwidth Multicast in Cooperative Environments", Proc. of the 19th ACM Symposium on Operating Systems Principles (SOSP), Oct. 2003.

V. Padmanabhan, H. Wang, P. Chou, and K. Sripanidkulchai, "Distributing Streaming Media Content Using Cooperative Networking", Proc. Of NOSSDAV 2002, May 2002.

J. Byers and J. Considine, "Informed Content Delivery Across Adaptive Overlay Networks", Proc. of ACM SIGCOMM, Aug. 2002.

D. Kostic, A. Rodriguez, J. Albrecht, and A. Vandat, "Bullet: High Bandwidth Data Dissemination Using an Overlay Mesh", Proc. of the 19th ACM Symposium on Operating Systems Principles (SOSP 2003), 2003.

Paul Francis, "Yoid: Extending the internet multicast architecture", Unpublished paper, Apr. 2000.

Yang-hua Chu, Sanjay G. Rao, and Hui Zhang, "A Case for End System Multicast", Proceedings of ACM Sigmetrics, Santa Clara,CA, Jun. 2000, pp. 1-12.

] Vivek K Goyal, "Multiple Description Coding: Compression Meets the Network", IEEE Signal Processing Magazine, May 2001.

B. Cohen, "Incentives build robustness in BitTorrent", P2P Economics Workshop, 2003.

Rob Sherwood, Ryan Braud, Bobby Bhattacharjee, "Slurpie: A Cooperative Bulk Data Transfer Protocol", IEEE Infocom, Mar. 2004.

P. Rodriguez, E. Biersack, "Dynamic Parallel-Access to Replicated Content in the Internet", IEEE Transactions on Networking, Aug. 2002.

John Byers, Michael Luby, and Michael Mitzenmacher, "Accessing Multiple Mirror Sites in Parallel: Using Tornado Codes to Speed Up Downloads", Infocom, 1999.

M. Izal, G. Urvoy-Keller, E.W. Biersack, P. Felber, A. Al Hamra, and L. Garces-Erice, "Dissecting BitTorrent: Five Months in a Torrent's Lifetime", Passive and Active Measurements 2004, Apr. 2004.

Dongyu Qiu, R. Srikant, "Modeling and Performance Analysis of BitTorrent-Like Peer-to-Peer Networks", To appear in SIGCOMM 2004.

John W. Byers, Michael Luby, Michael Mitzenmacher, and Ashutosh Rege, "A Digital Fountain Approach to Reliable Distribution of Bulk Data", SIGCOMM, 1998.

Petar Maymounkov and David Mazires, "Rateless Codes and Big Downloads", IPTPS'03, Feb. 2003.

K. Jain, M. Mandian, and M. R. Salavatipour, "Packing Steiner Trees", Proceedings of the 10th Annual ACM-SIAM Symposium on Discrete Algorithms (SODA), 2003.

G. Robins and A. Zelikovsky, "Improved Steiner Tree Approximation in Graphs", Proceedings of the 7th Annual ACM-SIAM Symposium on Discrete Algorithms (SODA), 2000.

M. Thimm, "On the Approximability Of The Steiner Tree Problem", Mathematical Foundations of Computer Science 2001, Springer LNCS, 2001.

T. Ho, R. Koetter, M. Medard, D. Karger, and M. Effros, "The Benefits of Coding over Routing in a Randomized Setting", ISIT, Yokohama, Japan, 2003.

G. Pandurangan, P. Raghavan and E. Upfal, "Building Low-diameter P2P Networks", 42nd Annual Symposium on Foundations of Computer Science (FOCS01), pp. 492-499, 2001.

M. Krohn, M. FreedMan, D. Mazieres, "On-the-Fly Verification of Rateless Erasure Codes for Efficient Content Distribution", IEEE Symposium on Security and Privacy, Berkeley, CA, 2004.

E. Adar, B. Huberman, "Free Riding on Gnutella", First Monday, Available at: www.firstmonday.dk/issues/issue5 10/adar/, 2000.

* cited by examiner

CONTENT DISTRIBUTION USING NETWORK CODING

CROSS-REFERENCE TO RELATED APPLICATIONS

This application claims the benefit of U.S. Provisional Application No. 60/585,212, filed Jul. 2, 2004.

BACKGROUND

In today's networked computing environments, it is often necessary or desirable to provide large-scale content delivery to nodes in a network. One mechanism used for large-scale content delivery is a content distribution system using network coding. In general, a content distribution system is a network of interconnected cooperative nodes using network coding to distribute any type of digital content from a source to one or more of the interconnected cooperative nodes. Typical content distribution systems first have to construct an efficient overlay topology and then schedule the transmittal of information across that topology such that all nodes share the distribution effort evenly.

Several factors may affect the efficiency of typical content distribution systems. First, the efficiency of a typical content distribution system may decrease as the number of nodes in the overlay topology increases. Second, the efficiency of a typical content distribution system may decrease as the network becomes more heterogeneous, particularly with respect to the bandwidth capabilities of each individual node. Third, the efficiency of a typically content distribution may decrease with the implementation of incentive mechanisms designed to prevent or minimize 'leeching' nodes. Leeching nodes are nodes that do not cooperate on the network and are modified so as to act only as receivers on the network, thus saving upload capacity for other uses.

SUMMARY

This summary is provided to generally introduce, in a simplified form, the reader to one or more select concepts described below in the detailed description. This summary is not intended to identify key and/or required features of the claimed subject matter, nor is it intended to be used as an aid in determining the scope of the claimed subject matter.

Disclosed herein are various technologies for providing fast and scalable content distribution in a content distribution network.

In accordance with some of the technologies described herein, digital content (e.g., a file) may first be divided into N blocks of content, which may or may not be encoded. One or more of the N blocks may then be distributed among nodes cooperating on the network.

The distributed blocks of content at any of the cooperating nodes of the Content Distribution Network may be encoded into encoded data packets. The encoded data packets at a cooperating node of the Content Distribution Network may contain information about the distributed blocks of content received at that particular cooperating node. Further, the encoded data packets at that particular cooperating may also contain information about other encoded data packets. Thus, an encoded data packet may be used in place of any distributed of the N blocks of content when reconstructing the digital content at a downstream receiving node.

That is, a client seeking to download at least a copy of the digital content divided into N blocks of content would download N encoded representations of the N blocks from random ones of the cooperating nodes of the Content Distribution Network, rather than being required to locate and download each of the original N blocks of content from either the source node or any combination of the nodes of the network.

DESCRIPTION OF THE DRAWINGS

The present description will be better understood from the following detailed description read in light of the accompanying drawings.

DETAILED DESCRIPTION

Figure 1:
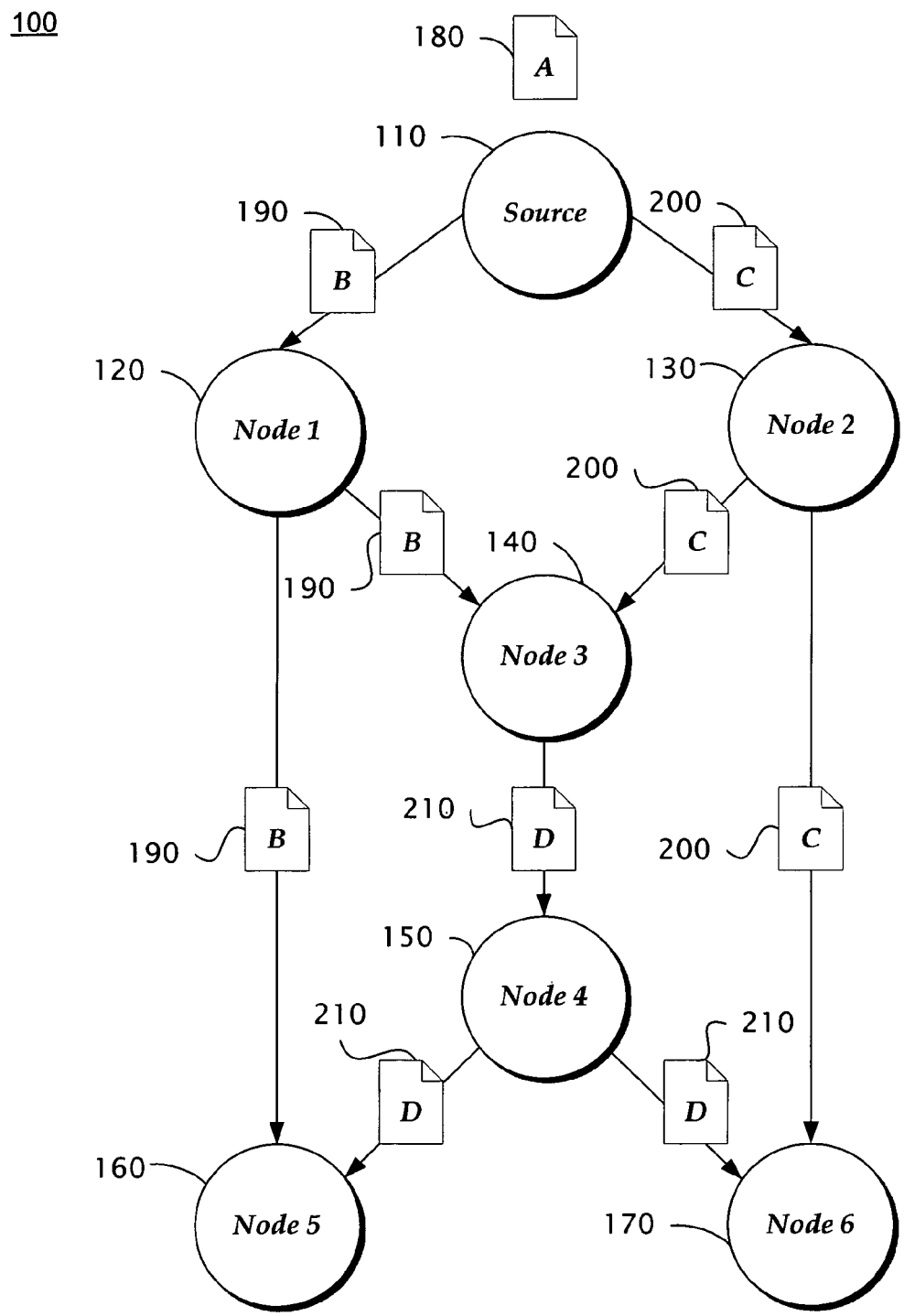
FIG. 1 shows a content distribution network environment in which examples of content distribution using network coding may be implemented.

Disclosed herein are various technologies for facilitating the delivery of digital content in a computer network.

In accordance with various embodiments described herein, a source node storing a file or piece of digital content to be shared among receiving nodes may communicate with a management service on the network to announce that the file or piece of digital content is available. Before commencing downloading or distributing the file or piece of digital content, the source node of the file (or, in general, piece of digital content) may divide the file (or, piece of digital content) into a predetermined number of blocks of a predetermined size and provide that information to any one of a management service on the network, a different service on the network, the receiving nodes on the network that may download the content, or to any other node on the network that may otherwise find the content useful.

Once the source node has announced that the file or piece of digital content is available for download or distribution, a receiving node on the network may communicate with the management service and select the file or piece of digital content for download. In at least one implementation of content distribution using network coding, when the receiving node has selected the file or piece of digital content to download, the receiving node may communicate with the management service on the network to learn of other receiving nodes that are to receive at least portions of the distributed file or piece of digital content from the source node.

When the source node has completed dividing the file or piece of original digital content into the predetermined number of blocks, the source node may then encode the blocks by choosing a set of mathematical modifiers in accordance with a mathematical system that has been chosen to encode the blocks. This chosen mathematical system may treat the blocks, the file, or piece of digital content as variables in an equation and may further treat the encoded block as the solution to the equation. Unencoded blocks may also be used in the same manner, and may also be included equally in the mathematical system with encoded blocks. For example, unencoded blocks may be considered to be a linear combination of the original block and no other blocks. Further, the source node may choose to encode only specific regions of the file and leave other regions unencoded.

Thus, once a receiving node has received enough encoded or unencoded blocks and their corresponding mathematical modifiers, the receiving node may solve the system of equations to learn the value of the variables (i.e., the blocks). Any mathematical system with the properties disclosed herein may be used, and therefore the implementations described herein are not so limited.

When the source node has encoded at least one block of the original digital content, the source node may begin distributing the one or more blocks to receiving nodes. In at least one alternative implementation of content distribution using network coding, a receiving node may not send a request for a specific block, but rather the receiving node may send a request to receive the set of mathematical modifiers. Further, once the receiving node has received the requested mathematical modifiers, the receiving node may then perform a calculation in accordance with the mathematical system to determine whether the mathematical modifiers provide additional information helpful to solving the mathematical system. Finally, upon determining the mathematical modifiers contain information helpful in solving the mathematical system, the receiving node may send a request to the source node to send the encoded block corresponding to the set of mathematical modifiers.

Additionally, in at least one other implementation of content distribution using network coding, once a receiving node (say, R) has received any number of blocks, the receiving node (R) may then act as a sending node functioning similarly to the source node in the content distribution network. For example, upon receiving requests from other receiving nodes (G), the receiving node (R) may serve as a source node by re-encoding blocks at the receiving node (R) in manner similar to that used by the source node to originally encode the blocks.

Upon receiving a minimum number of blocks and mathematical modifiers, a receiving node may begin solving the mathematical system to decode the received blocks. Solving the mathematical system may begin using any mixture of encoded or unencoded blocks, and may begin before the full set of blocks has been received. Once the blocks have been decoded to reproduce the original blocks, the receiving node may combine the decoded blocks to create a copy of the original file or piece of digital content.

FIG. 1 shows example Computer Network 100, including multiple interconnected network nodes, in which one or more examples of content distribution using network coding may be implemented.

As used herein, the term "node" may refer to any computer system, device, or process that is uniquely addressable, or otherwise uniquely identifiable, in Network 100, and that is operable to communicate with other nodes on Network 100. For example, and without limitation, a node may be a personal computer, a server computer, a hand-held or laptop device, a tablet device, a multiprocessor system, a microprocessor-based system, a set top box, a consumer electronic device, a network PC, a minicomputer, a mainframe computer, a distributed computing environment that includes any of the above systems or devices, or the like.

In cases where a node on Network 100 comprises a computer system or processing device of some form, the node may typically include a processor, one or more forms of computer-readable media, and one or more communications connections, which allow the node to operatively connect to Network 100. As used herein, computer-readable media may be any media that can store or embody information that is encoded in a form that can be accessed and understood by a computer. Typical forms of computer-readable media include, without limitation, both volatile and nonvolatile memory, data storage devices including removable and/or non-removable media, and communications media.

Communication media may embody computer-readable information in a modulated data signal, such as a carrier wave or other transport mechanism, and may include any information delivery media. The term "modulated data signal" may refer to a signal that has one or more of its characteristics set or changed in such a manner as to encode information in the signal. By way of example, and not limitation, communications media includes wired media such as a wired network or direct-wired connection, and wireless media such as acoustic, RF, infrared and other wireless media.

The functionality that is described herein with respect to a particular node on Network 100 may be implemented by the node itself, by the node in cooperation with one or more modules that may be included in or otherwise associated with the node, or by a number of sub-modules. For example, in at least one implementation of content distribution using network coding, operations performed by a node or module on Network 100 may be implemented as computer-executable instructions that are embodied in one or more computer-readable media. In these implementations, the operations of the node or the module may be executed by a processor or processors in the node in which the module is included or associated. In other implementations, the operations of a node may be implemented as hardware, firmware, or some combination of hardware, firmware, and software, either as a part of, or in some other way associated with, the node in which the module is included or associated. Furthermore, the functionality that is described herein with respect to a particular node may be carried out by, or distributed across, a number of nodes.

Content distribution using network coding may be further explained, with reference to FIG. 1, by considering an example implementation in which Source 110 is to distribute Content A 180 to participating nodes over Network 100. Although Content A 180 may be any type or size of file, for the purposes of this example assume Content A 180 is composed only of two digital bits, which include a binary digit 0 and a binary digit 1.

According to at least one example implementation, Source 110 may divide Content A 180 into Block B 190 containing a binary digit 0 and Block C 200 containing a binary digit 1. Further, Source 110 may send Block B 190 to Node 1 120, and may also send Block C 200 to Node 2 130. Node 1 120 may forward Block B 190 to Node 3 140 as well as to Node 5 160. Node 2 130 may forward Block C 200 to Node 3 140 as well as to Node 6 170.

Having received Block B 190 and Block C 200, Node 3 140 may then weigh the efficiency of forwarding, to Node 4 150, Block B 190 against Block C 200. This efficiency determination may take into consideration that Node 3 140 may have no knowledge of any other node to which Node 4 150 may be connected or of any data that the nodes to which Node 4 150 is connected may require in order to reconstruct Content A 180.

An example scenario resulting from the aforementioned efficiency determination may contemplate Node 3 140 sending Block B 190 to Node 3 140. Node 4 150 may then be able to forward useful information only to Node 6 170, and Node 5 160 may have to wait to receive Block B 190 in order to reconstruct Content A 180. Another example scenario may contemplate Node 3 140 sending Block C 200 to Node 4 150.

Node 4 150 may then be able to forward useful information only to Node 5 1 60, and Node 6 170 may have to wait to receive Block B 190, in order to reconstruct Content A 180.

However, at least one implementation of content distribution using network coding includes Node 3 140 encoding Block B 190 and Block C 200 to form Block D 210, which may then be forwarded to Node 4 150. For example, Node 3 140 may create Block D 210 by performing an exclusive-OR operation of the information corresponding to Block B 190 and Block C 200 at Node 3 140. As a result, Block D 210 may contain binary digit 1, which is the exclusive-OR of binary digit 0 (corresponding to Block B 1 90) and binary digit 1 (corresponding to Block C 200).

Node 4 150 may then forward Block D 210 to Node 5 160 and Node 6 170. Further, since the information corresponding to both Block B 190 and Block C 200 may be recovered by performing a decoding function on Block D 210, Block D 210 is simultaneously useful to both Node 5 160 and Node 6 170 in order to reconstruct Content A 180.

That is, Node 5 160 may already have received Block B 190 from Node 1 120. Then, having received Block D 210 from Node 4 150 and having knowledge of the encoding scheme used to create Block D 210, Node 5 160 may perform a decoding function on Block D 210 to calculate the information corresponding to Block C 200 without actually receiving Block C 200. Thus, Node 5 160 may utilize the information corresponding to Block B 190 and Block C 200 to reconstruct Content A 180 according to at least one implementation of content distribution using network coding.

Similarly, Node 6 170 may have already received Block C 200 from Node 2 130. Then, having received Block D 210 from Node 4 150 and having knowledge of the encoding scheme used to create Block D 210, Node 6 170 may perform a decoding function on Block D 210 to calculate the information corresponding to Block B 190 without actually receiving Block C 200. Thus, Node 6 170 may utilize the information corresponding to Block B 190 and Block C 200 to reconstruct Content A 180.

One or more implementations of content distribution using network coding may further provide an end-system content distribution solution that efficiently utilizes network resources to provide client nodes with blocks of information from multiple network paths. Such efficient utilization of resources may include providing one or more nodes on Network 100 with advance knowledge of the arrangement and locations of other nodes on Network 100 as well as advance knowledge regarding which of such nodes on Network 100 are to distribute original blocks and which nodes are to distribute encoded blocks. Thus, content distribution using network coding may be relevant even as networks increase in size and nodes on the network toggle between being online and offline.

For example, when a source node sends a block to a receiving node, the source node may generate and send a linear combination of the data available at the source node. The linear combination may include an exclusive-OR operation. Thus, when a receiving node receives sufficient linearly independent combinations of blocks, the receiving node may then reconstruct the original digital content by solving a system of linear equations to decode the received linear combinations.

Further, to reduce wasted transfers, nodes on Network 100 may endeavor to send only blocks having innovative information to other nodes on Network 100, although absolute compliance to this desire is not required for effective implementation of content distribution according to the examples described herein. Such efficient transfers may be accomplished by the nodes on Network 100 periodically exchanging information regarding the blocks stored locally at the respective nodes on Network 100. The periodic exchange of information may occur when a respective one of the nodes on Network 100 has determined that locally stored information may be useful for another node to reconstruct at least a portion of the original digital content.

The aforementioned periodic exchange of information may be implemented by storing the information at one or more central servers on Network 100. Various nodes may then access one of the central servers to determine which of the other nodes on Network 100 store blocks that contain innovative information. Alternatively, decentralized mechanisms may be used to communicate directly with other nodes on Network 100 to exchange information regarding the blocks stored at the respective nodes. As a further alternative, any combination in whole or in part of the approaches discussed above may be implemented.

Thus, when a particular node on Network 100 has knowledge of the information contained in the blocks stored at other nodes on Network 100, the particular node may request that the other nodes transfer only the information that the particular node currently lacks (i.e., innovative information). Alternatively, a particular node on Network 100 may randomly generate new blocks and push the new blocks to other nodes on Network 100, regardless of whether or not the other nodes have determined the particular node has innovative information stored locally. In response, the respective receiving nodes may discard any packet that may be determined to not contain innovative information for the respective receiving node.

Figure 2:
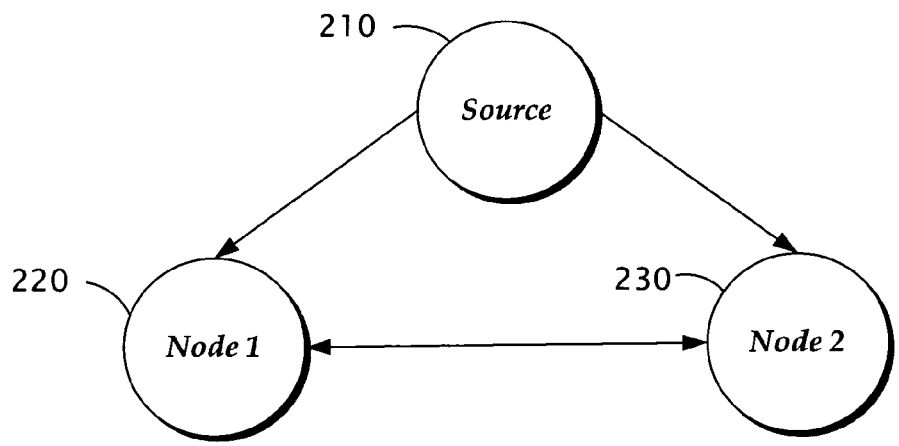
FIG. 2 shows a content distribution network environment in which examples of content distribution using network coding may also be implemented.

FIG. 2 shows example Computer Network 200 in which one or more examples of content distribution using network coding may be implemented. Computer Network 200 may include multiple interconnected nodes in a manner similar to that of FIG. 1.

A further example implementation of content distribution using network coding may be explained by considering an example scenario in which Source 210 is to distribute, over Network 200, an original content file containing six bytes (i.e., Bytes 1-6). Further, the example scenario may assume the sample values: Byte 1=70, Byte 2=91, Byte 3=5, Byte 4=35, Byte 5=22, and Byte 6=15.

By this example, Source 210 may create multiple blocks from the original content file, with each block includes two sequential bytes from the original content file. For example, Source 210 may create: Block 1 comprising Byte 1 and Byte 2; Block 2 comprising Byte 3 and Byte 4; and Block 3 comprising Byte 5 and Byte 6.

Source 210 may then create linear combinations of Block 1, Block 2, and Block 3 using a set of coefficient vectors to encode Block 1, Block 2, and Block 3 into a single encoded block. The coefficient vectors may be chosen randomly, chosen according to a set schedule, chosen from a central repository of such information on the network, or chosen by any method that produces a set of coefficient vectors useable by Source 210 in order to linearly encode Block 1, Block 2, and Block 3.

For the purposes of describing the present example, Source 210 may choose coefficient vectors randomly from a set of numbers between 1 and 256. The set of numbers from which coefficient vectors may be chosen may be any set of numbers, for example, a set of numbers which will produce the greatest number of linearly independent coefficient vectors in the content distribution system. In preparing the encoded block, for example, Source 210 may choose a first coefficient vector to be 6, 90, and 52. In order to create the encoded block, Source 210 may treat the individual bytes in the block as a vector. However, Source 210 may linearly encode the information in each Block 1, Block 2, and Block 3 in any manner that is consistent with producing a new block containing information that is a linear combination of information stored within the original block. In this example, the first encoded block called $e_1$ is created by multiplying the coefficient vectors by each value in the vector.

For example, using the first coefficient vector [6, 90, and 52] and byte values Byte 1=70, Byte 2=91, Byte 3=5, Byte 4=35, Byte 5=22, and Byte 6=15, Source 210 may creates $$e_1 = 6\binom{70}{91} + 90\binom{5}{35} + 52\binom{22}{15}.$$

Performing the multiplication results in $$e_1 = \binom{420}{546} + \binom{450}{3150} + \binom{1144}{780}.$$

Performing the addition results in $$e_1 = \binom{2014}{4476}.$$

Source 210 may then forward newly encoded block $e_1$ and the coefficient vector [6, 90, 52], to Node 1 220.

Source 210 may then create a new encoded block $e_2$ by repeating the operation used to create $e_1$ using a new coefficient vector. For example, using another coefficient vector [18, 2, 128] and byte values Byte 1=70, Byte 2=91, Byte 3=5, Byte 4=35, Byte 5=22, and Byte 6=15, Source 210 may produce encoded block $e_2$ using the same method as above. In this example, $$e_2 = \binom{4086}{3628}.$$

Source 210 may forward the newly encoded block $e_2$, and the coefficient vector [18, 2, 128], to Node 2 230.

Node 1 220 may then learn of the linear independence of the linearly encoded blocks in possession of other nodes on network 200 to further determine whether or not the blocks contain innovative information that Node 1 220 may use to decode the encoded blocks and recover the original content file. Thus, Node 1 220 may then send a query to Node 2 230 to request that Node 2 230 send information that Node 1 220 may use to determine the linear independence of the information encoded in the blocks that Node 2 230 currently possesses.

Node 2 230 may use any method to produce the information that may enable Node 1 220 to determine the linear independence of the information in the encoded blocks. For example, Node 2 230 may create a linear combination of the individual coefficient vectors currently at Node 2 230 to produce a master coefficient vector. In this example, encoded block $e_2$ having coefficient vector [18, 2, 128] is currently at Node 2 230, and therefore Node 2 230 may not need to perform the aforementioned linear combination. Therefore, Node 2 230 may forward coefficient vector [18, 2, 128] to Node 1 220.

Node 1 220 may receive coefficient vector [18, 2, 128] from Node 2 230, and seek to determine the linear independence of the received coefficient vector with respect to the coefficient vectors of the blocks Node 1 220 currently possesses. Any mathematical operation that results in Node 1 220 determining the linear independence of the coefficient vectors received from Node 2 230 may be used.

For example, Node 1 220 may place coefficient vector [18, 2, 128] received from Node 2 230 into a matrix and produce a row-reduced form of the matrix. Node 1 220 may then analyze the number of non-zero rows in the row-reduced form of the matrix to discover a rank of the matrix. The rank of the respective matrices indicates the number of linearly independent rows of the respective matrices. In the current example, by adding the received coefficient vector to the matrix and calculating the rank of the matrix, Node 1 220 is determining the number of solutions to the system of linear equations Node 1 220 currently possesses.

For example, Node 1 220 may calculate the rank of the matrix formed using the set of coefficient vectors of encoded blocks that Node 1 220 already possesses. Node 1 220 may calculate rank 1 by performing row reduction on the matrix. Row reduction for calculating the rank of a matrix is a known mathematical operation. Thus, calculating the rank of the matrix at Node 1 200 is not limited to any particular method.

Accordingly, the row-reduced version of the matrix (6 90 52) is (1 15 8.$\overline{6}$), and the number of non-zero rows in the row reduced matrix is 1, and accordingly, the rank of the matrix is 1.

Further, Node 1 220 may now form a new matrix using the coefficient vectors of the blocks that Node 1 220 already possesses and the coefficient vector received from Node 2 230, which in this example would be $$\begin{pmatrix} 6 & 90 & 52 \\ 18 & 2 & 128 \end{pmatrix}.$$

Once Node 1 220 has formed the new matrix, Node 1 220 may calculate the rank of the new matrix.

Accordingly, the row reduced version of the matrix is $$\begin{pmatrix} 1 & 0 & 7.0995 \\ 0 & 1 & 0.10448 \end{pmatrix},$$

and further, the number of non-zero rows in the matrix is 2, therefore the rank of the matrix is 2. Node 1 220, may, for example, compare the rank of the second matrix (ie., 2) and the rank of the first matrix (i.e., 1), and determine that the rank of the second matrix is greater, therefore the information Node 2 230 possesses is linearly independent. Node 1 220 may send a request to Node 2 220 to transmit the block or blocks created using the coefficient vector that was sent and which Node 1 220 used to perform the calculations above.

In this example, while Node 1 220 performs the above calculation, Node 2 220 may have further received an additional encoded block from Source 210. For example, Source 210 may choose another coefficient vector, [213, 91, 159] to encode a new block $e_3$ that would equal $$\begin{pmatrix} 18863 \\ 24953 \end{pmatrix}$$

and then transmit block $e_3$ and the coefficient vector used to create $e_3$ to Node 2 230.

Node 1 220 may send Node 2 230 a new request to determine if Node 2 230 possesses any information which is linearly independent with respect to the information Node 1 220 currently possesses. Node 2 230 may again prepare a master coefficient vector which may be created from a linear combination of the coefficient vectors of all the encoded blocks that Node 2 230 possesses (ie., $e_2$ and $e_3$) with coefficient vectors [18, 2, 128] and [213, 91, 159] respectively. Node 2 230 may prepare the master coefficient vector by producing the linear combination of the above coefficient vectors to produce a new coefficient vector [231, 93, 287], which Node 2 230 then transmits to Node 1 220.

Node 1 220 may receive new coefficient vector, [231, 93, 287] and determine whether the new coefficient vector is linearly independent with respect to the coefficient vectors Node 1 220 currently possesses. Node 1 220 has stored the results of the last calculation of the rank (i.e., 2) of the matrix formed using the coefficient vectors of block $e_2$ and block $e_3$. Node 1 220 may, for example, produce a new matrix using the coefficient vectors of block $e_2$ and block $e_3$ in combination with the new coefficient vector received from Node 2 230, resulting in a matrix of the form $$\begin{pmatrix} 6 & 90 & 52 \\ 18 & 2 & 128 \\ 231 & 91 & 159 \end{pmatrix}.$$

Accordingly, the row reduced form of the matrix is $$\begin{pmatrix} 1 & 0 & 0 \\ 0 & 1 & 0 \\ 0 & 0 & 1 \end{pmatrix},$$

and since the number of non-zero rows in the matrix is 3, the rank of the matrix is 3. Node 1 220 may compare the rank (i.e., 3) of the new matrix with the rank of the previous matrix (i.e., 2), and determine the rank of the new matrix is greater than the rank of the previous matrix. Thus, Node 1 220 may determine that Node 2 230 possesses information that is linearly independent from the information that Node 1 220 possesses. Node 1 220 may then send a request to Node 2 230 to re-encode the encoded blocks that Node 2 230 produced using the coefficient vector that was transmitted to Node 1 220.

Node 2 230 may use any method to produce a newly encoded block that is consistent with sending linearly independent information with regard to the original encoded blocks received from Source 210. For example, Node 2 230 may create a sum of $e_2$ and $e_3$ to produce a new encoded block $e_4$, and $e_4$ may equal to $$\begin{pmatrix} 22949 \\ 28581 \end{pmatrix}.$$

Node 2 230 may now transmit block $e_4$ to Node 1 220 and not need to further send the coefficient vector used to produce block $e_4$ because the coefficient vector was sent to Node 1 220 to perform the calculation.

For example, Node 1 220 may have received block $e_4$ from Node 2 230, and Node 1 220 may determine that enough encoded blocks have been received to begin decoding the encoded blocks. Node 1 220 may then solve the system of linear equations represented by the encoded blocks that Node 1 220 possesses in order to determine the values of the vectors in the original unencoded blocks possessed by Source 210. Node 1 220 may use any method suitable to solve the system of linear equations to determine the values of the vectors stored in the original unencoded blocks and is not limited in the way in which Node 1 220 may perform the calculation.

For example, $e_1$ equals $$\begin{pmatrix} 2014 \\ 4476 \end{pmatrix}$$

with coefficient vector [6, 90, 52]. $e_2$ equals $$\begin{pmatrix} 4086 \\ 3628 \end{pmatrix}$$

with coefficient vector [18, 2, 128]. $e_4$ equals $$\begin{pmatrix} 22949 \\ 28581 \end{pmatrix}$$

with coefficient vector [231, 93, 287]. In order to solve the system of linear equations to learn the values of the vectors in the original blocks, Node 1 220 may assign variables to represent each of the unencoded blocks. For example, Node 1 220 may assign the variable x to represent the first unencoded block, may assign the variable y to represent the second unencoded block, and may assign the variable z to represent the third unencoded block. Therefore, Node 1 220 may determine the first equation in the system of linear equations to be $$6x + 90y + 52z = \begin{pmatrix} 2014 \\ 4476 \end{pmatrix}$$

which represents encoded block $e_1$, the second equation to be $$18x + 2y + 128z = \begin{pmatrix} 4086 \\ 3628 \end{pmatrix}$$

which represents encoded block $e_2$, and the third equation to be $$231x + 93y + 287z = \begin{pmatrix} 22949 \\ 28581 \end{pmatrix}$$

which represents encoded block $e_4$.

Node 1 220 may then solve the system of linear equations using any method, and in solving the equations determines that x (i.e., unencoded block 1) equals $$\begin{pmatrix} 70 \\ 91 \end{pmatrix},$$

and determines y (i.e., unencoded block 2) equals $$\begin{pmatrix} 5 \\ 35 \end{pmatrix},$$

and further determines z (i.e., unencoded block 3) equals $$\begin{pmatrix} 22 \\ 15 \end{pmatrix}.$$

Node 1 220 may interpret these vectors and recreate the byte structure of the original file. Node 1 220 may use any method to interpret these vectors in accordance with the aspects of the current embodiment to recreate the original file.

Although the example used in conjunction with FIG. 2 utilized certain simplifications, obviously different choices may be made for alternative implementations. For instance, alternative examples for exchanging information regarding the coefficients used to encode packets may contemplate transmitting re-encoded blocks without determining in advance whether the re-encoded blocks contain new information or not exchanging information at all. Similarly, although all received information was used to create new encoded blocks, a subset thereof may be used. Other tradeoffs or choices could also be made, such as the particular encoding scheme depending on the particular application.

Further, although the example used in conjunction with FIG. 2 was implemented with a real number system for illustrative purposes, the example may have been implemented using any mathematical number system, for example, a finite or Galois field.

Figure 3:
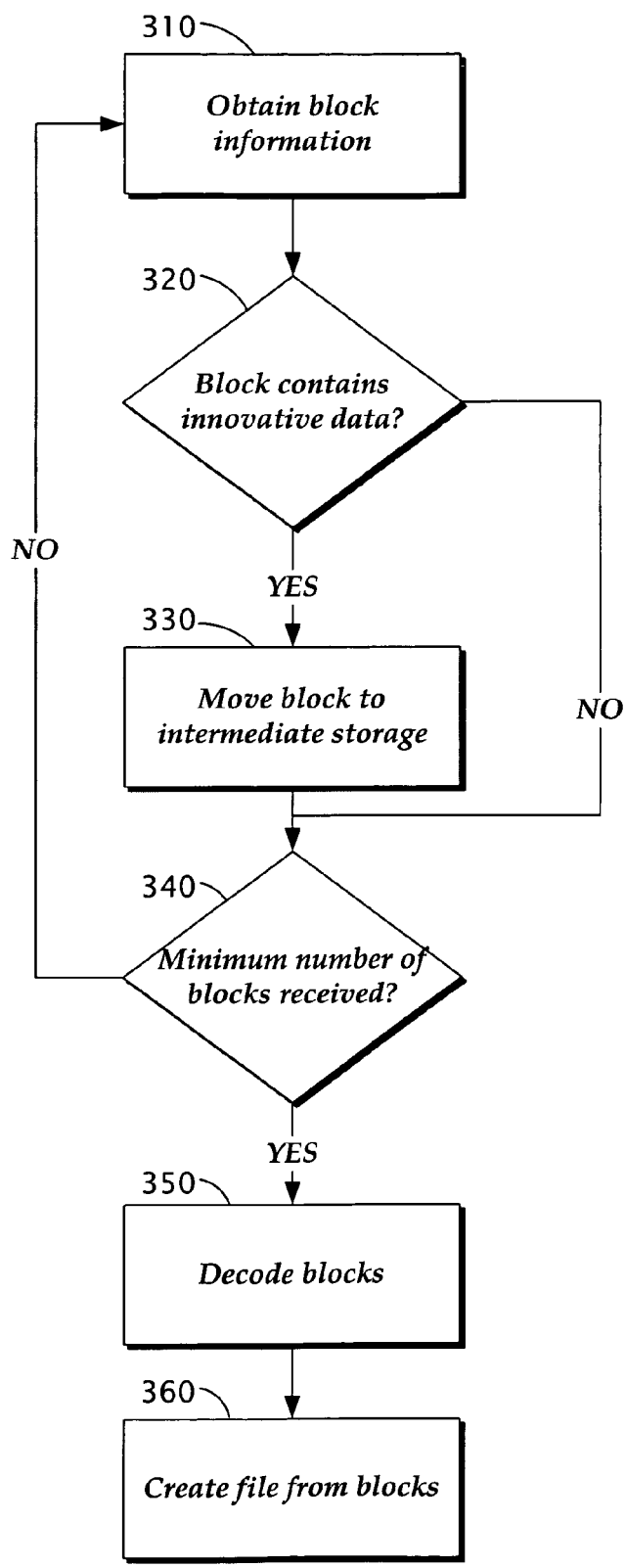
FIG. 3 shows an example processing flow for content distribution using network coding from the perspective of a receiver.

FIG. 3 shows processing flow 300 to illustrate how a node might act as a receiver in a content distribution network.

Operation 310 may represent a node obtaining information about a specific block which exists on the network. Referring back to the example illustrated with respect to FIG. 2, block information may take the form of a set of coefficients used to re-encode the block. However, block information may also take any form or structure that gives an indication as to the contents of the block, and block information may be obtained in any manner consistent with the capabilities of the network, the nodes on the network, or the like. For example, block information may be obtained directly from another node on the network, the block information may be obtained from a central repository of such information on the network, or the node may have already received the block and may have inspected the block to determine the information.

Decision 320 may represent a determination by the node as to whether or not the block information indicates that the block contains innovative information that may be helpful in reconstructing at least a portion of the original content. Information that is innovative to the node is, for example, a whole block or a portion of a block that the node does not currently possess. This determination may take any form, for example, by performing a calculation using the block information. Alternatively, any operation using the block information which returns an indication as to whether or not the information in the block is innovative may be used. For instance, in the example associated with FIG. 2, the determination may be performed by calculating the rank of a matrix.

Operation 330, subsequent to positive decision 320, may refer to the block being transferred to intermediate block storage, which may comprise physical memory, a hard drive, non-volatile flash memory, or the like. Once Operation 330 has been completed, procedure flow continues to Decision Block 340.

Decision 340, subsequent to negative decision 320 and operation 330, may represent a determination of whether a minimum number of blocks necessary to reassemble the original file content have been received. The minimum number of blocks necessary to reassemble the original file content may be N, which is the number of blocks into which the original file content is divided. In response to a negative determination, processing flow 300 may return to Operation 310 so further blocks may be processed. In response to positive decision 340, processing flow 300 may proceed to Operation 350.

Operation 350 may refer to an operation wherein a number of encoded blocks that are stored in intermediate block storage are decoded to produce the set or subset of original blocks that comprise the file. Decoding of the blocks may take a form in which the result of the decoding operation is the original set of blocks that may have been created by the source of the file in the Content Distribution Network. Processing flow 300 may then proceed to Operation 360.

Operation 360 may represent the set of original blocks produced by the decoding operation in Operation 350 being combined to assemble the original content file. A method by which the original blocks may be reconstructed to form the original content may be used.

The order and timing of the operations associated with FIG. 3 are provided as an example only. In alternative implementations, either or both of the order and timing of the operations may be varied. For example, Operation 350 may take place after Operation 310 if enough encoded blocks have been received to begin decoding at least one encoded block.

Figure 4:
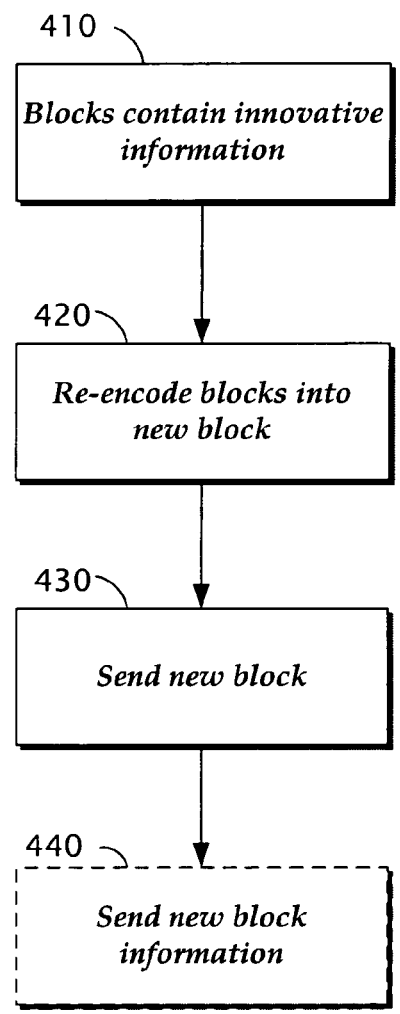
FIG. 4 shows an example processing flow for content distribution using network coding from the perspective of a sender.

FIG. 4 shows example flow 400 to illustrate how a node may act as a sender in a Content Distribution Network.

Operation 410 may refer to a determination that the sender possesses a number of blocks that contain innovative information that may be useful for decoding another block or set of blocks on another node in the Content Distribution Network. The determination may occur locally on the sender, on another node on the network, on a central node responsible for such operations, or at any other suitable location. The determination of whether the block contains innovative information may result in a linear combination of the innovative information with other information at the sending node being distributed on the Content Distribution Network.

Operation 420 may refer to the sender re-encoding one or more local blocks to produce a newly encoded block. The re-encoding may comprise an operation that is in accordance with combining any number of blocks stored locally on the sender to produce a new block which may be used by another node on the Content Distribution Network.

Operation 430 may refer to the sender transmitting the newly encoded block created at Operation 420. The newly encoded block may be transmitted in accordance with the aspects of the current embodiments and is not limited in the manner in which it may be transmitted.

Operation 440, which may be optional, may refer to the sender choosing to further transmit the information used to re-encode the block in a separate step, if the information used to re-encode the block was not encoded into the new encoded block. The block encoding information may be transmitted in accordance with the aspects of the current embodiments and is not limited in the manner in which it may be transmitted.

The order and timing of the operations associated with FIG. 4 are provided as an example only. In alternative implementations, either or both of the order and timing of the operations may be varied. For example, Block 420 may be undertaken to re-encode new blocks that are useful for a receiving node as well as all the nodes connected to the receiving node. In this manner, the receiving node may create blocks that are useful to nodes other than the node with which it is in direct communication.

Figure 5:
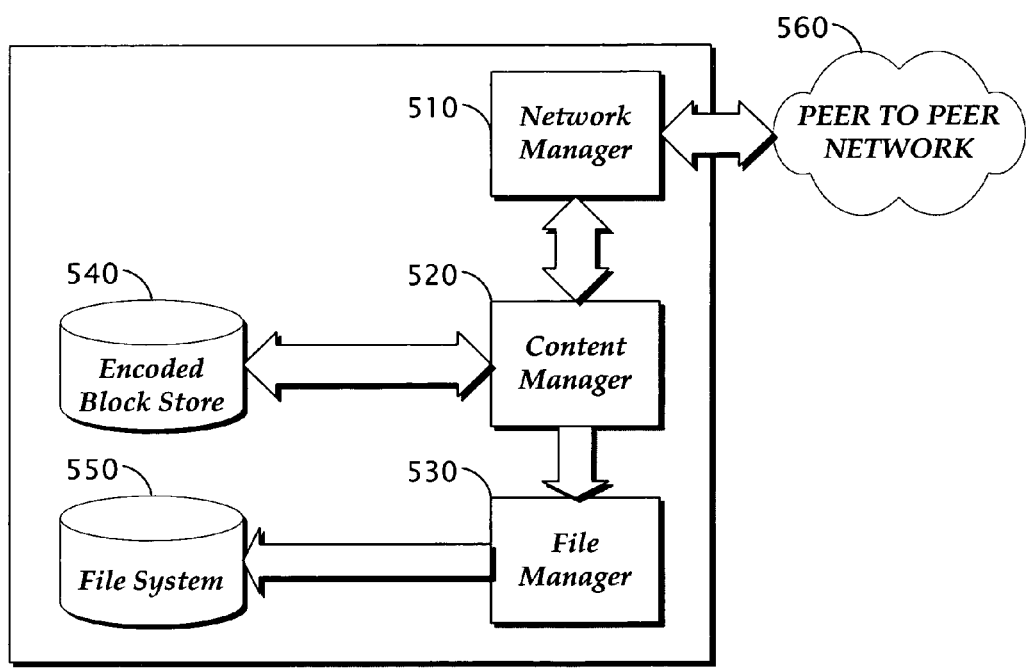
FIG. 5 shows an example system in which content distribution using network coding may be implemented.

FIG. 5 shows example node 500 in a Content Distribution Network.

Network Manager 510 may enable node 500 to communicate with other nodes, servers, devices, or the like in the Content Distribution Network. Network Manager 510 may send and receive packets or blocks of information, send or receive requests to perform an operation of any type, or send and receive other information used by node 500 to participate in the Content Distribution Network.

In communicating with other nodes on the Content Distribution Network, Network Manager 510 may correct errors during transmission, suspend and resume the sending of information to other nodes, servers, devices and the like on the Content Distribution Network, and may further verify that node 500 is permitted to participate in the Content Distribution Network. Further still, Network Manager 510 may verify the legitimacy or authenticity of the encoded blocks.

Network Manager 510 may further communicate with Content Manager 520 via, e.g., an application programming interface (API), a remote procedure call over a network. Network Manager 510 may transmit blocks, information with respect to blocks stored elsewhere on the network, or information that Content Manager 520 may require for node 500 to participate in the Content Distribution Network in accordance with the aspects of the current embodiments.

Content Manager 520 may receive the number and size of blocks that the original file content was divided into by an origination source from Network Manager 510. Content Manager 520 may further receive blocks from Network Manager 510 send blocks using Network Manager 510, commit received blocks to Encoded Block Store 540, abort the storage of blocks that have not been received in their entirety or that have been determined to contain an error or corruption, and transfer blocks that are stored within Encoded Block Store 540 to both Network Manager 510 and File Manager 530.

Content Manager 520 may also perform at least one calculation to determine if a node in the Content Distribution Network contains innovative information that is useful to the node in decoding the original blocks into which original file content was divided by an origination node on the Content Distribution Network. If Content Manager 520 determines that a node in the Content Distribution Network contains innovative information, Content Manager 520 may communicate with Network Manager 510 and issue a request to receive the block, issue a request for the node containing the innovative information to re-encode the information and send the information, or issue another request for Content Manager 520 to function in accordance with the participation of the node in the Content Distribution Network.

Further, Content Manager 520 may also perform at least one calculation on behalf of another node on the Content Distribution Network to determine if the node contains information innovative to another node on the Content Distribution Network.

Content Manager 520 may further re-encode blocks stored within Encoded Block Store 540 using a method for the node to produce encoded blocks that are useful to other nodes in the Content Distribution Network or for the node to participate in the Content Distribution network in accordance with the aspects of the current embodiments.

Deletion of blocks in Encoded Block Store 540, memory management in Encoded Block Store 540, or any operation that results in optimal operation of Encoded Block Store 540 may also be performed by Content Manager 540.

Content Manager 520 may also determine when the number of encoded blocks necessary to decode the blocks and recover the original file has been received and are stored in Encoded Block Storage 540. Upon making this determination, Content Manager 520 may decode the encoded blocks and transfer each decoded block to File Manager 530.

File Manager 530 and Content Manager 520 may communicate using, e.g., an application programming interface (API) or a remote procedure call over a network. File Manager 530 may receive a number of unencoded blocks from Content Manager 520 and combine a number of unencoded blocks to create a copy of the original file content sent by an origination node in the Content Distribution Network.

Once File Manager 530 has combined the unencoded blocks to create the copy of the original file content, File Manager 530 may communicate with File System 550 to commit the copy of the original file to the storage capabilities of File System 550. File System 550 may represent a hard drive, a network share, non-volatile removable storage, or any physical storage medium capable of storing the copy of the original file in accordance with the aspects of the current embodiments. File Manager 530 may further communicate with an operating system, a component, an application programming interface (API), or any other device that stores the copy of the original file on behalf of the File Manager 530.

Although some particular implementations of systems and methods have been illustrated in the accompanying drawings and described in the foregoing Detailed Description, it will be understood that the systems and methods shown and described are not limited to the particular implementations described, but are capable of numerous rearrangements, modifications and substitutions without departing from the spirit set forth and defined by the following claims.

We claim:

1. One or more tangible physical storage media storing one or more executable instructions that, when read, cause one or more processors of a first node to perform a process comprising:

receiving a master coefficient vector via a data network from a second node that is storing the coefficient vector, the master coefficient vector comprising a linear combination of other coefficient vectors at the second node that were used to encode a block of a file into respective encoded blocks stored by the second node, the encoded blocks at the second node comprising different encodings of the block of the file;

determining if the received coefficient vector is linearly independent from one or more coefficient vectors at the first node, the first node storing, prior to receiving the master coefficient vector, the one or more coefficient vectors and one or more encoded blocks comprising encodings of the block of the file using the one or more coefficient vectors, respectively;

when it is determined that the received coefficient vector is linearly independent from the one or more coefficient vectors stored by the first node prior to receiving the master coefficient vector, responding to said determination by sending a request via the data network to the second node; and receiving via the data network, a transmission from the second node sent in response to the request, the transmission comprising a new encoded block comprising a linear combination of the one or more encoded blocks stored by the second node.

2. The storage media of claim 1, wherein the one or more encoded blocks stored by the second node were previously encoded by a source node storing the block of the file.

3. The storage media of claim 2, wherein the one or more encoded blocks at the first node and one or more blocks at the second node comprise linear encodings of the block of the file.

4. The storage media of claim 1, further comprising one or more instructions that, when read, cause the first node to receive the size of file and a number of blocks of the file.

5. The storage media of claim 1, further comprising one or more instructions that, when read, cause the first node to further receive information used to encode the one or more blocks stored thereon prior to sending the request to the second node.

6. The storage media of claim 5, further comprising one or more instructions that cause the first node to utilize the results of a calculation using the received information to encode the one or more blocks at the first node to determine if the request should be issued to the second node.

7. The storage media of claim 6, further comprising one or more instructions that, when read, cause the first node to further choose to discard the one or more encoded blocks based on the results of the calculation.

8. The storage media of claim 1, further comprising reconstructing the block of the file by decoding the new encoded blocks received from the second node.

9. A method performed by a first node communicating with a second node via a data network, the first node storing a first encoded block of a file and a corresponding coefficient vector that was applied to an un-encoded block of the file to form the first encoded block, the second node storing second and third encoded blocks and second and third coefficient vectors that were applied to the same un-encoded block of the file to form the second and third encoded blocks, respectively, the method comprising:

receiving, at the first node, via a data network, a master coefficient vector from the second node, the master coefficient vector comprising a linear combination of the second and third coefficient vectors;

determining, by the first node, if the received master coefficient vector is linearly independent from the first coefficient vector stored by the first node; and in response to determining that the received master coefficient vector is linearly independent of the first coefficient vector, transmitting a request to the second node;

receiving a new encoded block from the second node, the new encoded block having been transmitted via the data network in response to the request, the received new encoded block comprising a linear combination of the second and third encoded blocks; and finding a solution to a system of linear equations comprised of the first encoded block the received encoded block, the first coefficient vector, and the received coefficient vector, the solution comprising the un-encoded block of the file.

10. The method of claim 9, wherein the determining comprises creating a first matrix using the first coefficient vector.

11. The method of claim 10, further comprising:

creating a second matrix using the first and the received master coefficient vectors.

12. The method of claim 11, wherein the determining comprises:

calculating a rank of the second matrix and comparing it to a rank of the first matrix.

13. The method of claim 11, further comprising:

calculating a rank of the first matrix, calculating a rank of the second matrix, and wherein the determining comprises comparing the rank of the second matrix with the rank of the first matrix.

14. The method of claim 9, wherein the finding the solution begins when the new encoded block is received from the second node.

15. A method according to claim 9, wherein the determining comprises comparing a rank of a first matrix with the rank of a second matrix, where the first matrix includes the first coefficient vector and does not include the received master coefficient vector, and where the second matrix includes both the first coefficient vector and the received master coefficient vector.

16. A method according to claim 9, wherein the first, second, and third encoded blocks are encoded with their corresponding coefficient vectors by linearly combining portions of the un-encoded block according to the coefficient vectors.

17. A method performed by a first node participating in a content sharing network comprised of other nodes including a second node, the nodes interconnected via a data network, wherein a source node has previously divided a file into blocks, encoded one of the blocks of the file with different coefficient vectors to form encoded blocks, respectively, and distributed the encoded blocks and corresponding coefficient vectors to various of the nodes including the first node and the second node, such that the first node has a first coefficient vector and a corresponding first encoded block and the second node has a second coefficient vector and a corresponding second encoded block, wherein each encoded block was encoded by using its corresponding coefficient vector to linearly combine portions of the one of the blocks of the file, the method performed by the first node comprising:

transmitting a first request to the second node, and in response receiving the second coefficient vector from the second node;

determining that the second coefficient vector is linearly independent of the first coefficient vector, and in response transmitting a second request to the second node;

receiving from the second node a response to the second request, the response comprising the second encoded block; and obtaining the one of the blocks of the file by finding a solution to a system of linear equations formed by the first and second coefficient vectors and the first and second encoded blocks.

18. A method according to claim 17, wherein system of linear equations comprises a first equation comprised of the first coefficient vector and the first encoded block and a second equation comprised of the second coefficient vector and the second encoded block.

* * * * *

UNITED STATES PATENT AND TRADEMARK OFFICE
CERTIFICATE OF CORRECTION

PATENT NO.        : 7,756,051 B2
APPLICATION NO.   : 11/152754
DATED             : July 13, 2010
INVENTOR(S)       : Pablo Rodriguez Rodriguez et al.

Page 1 of 1

It is certified that error appears in the above-identified patent and that said Letters Patent is hereby corrected as shown below:

In column 15, line 30, in Claim 4, delete "of file" and insert -- of the file --, therefor.

Signed and Sealed this
Eighth Day of February, 2011

David J. Kappos
*Director of the United States Patent and Trademark Office*